June 28, 1938.  R. J. BRANDT  2,122,195
ELECTRODE RELEASE FOR ARC LAMPS
Filed Nov. 9, 1937
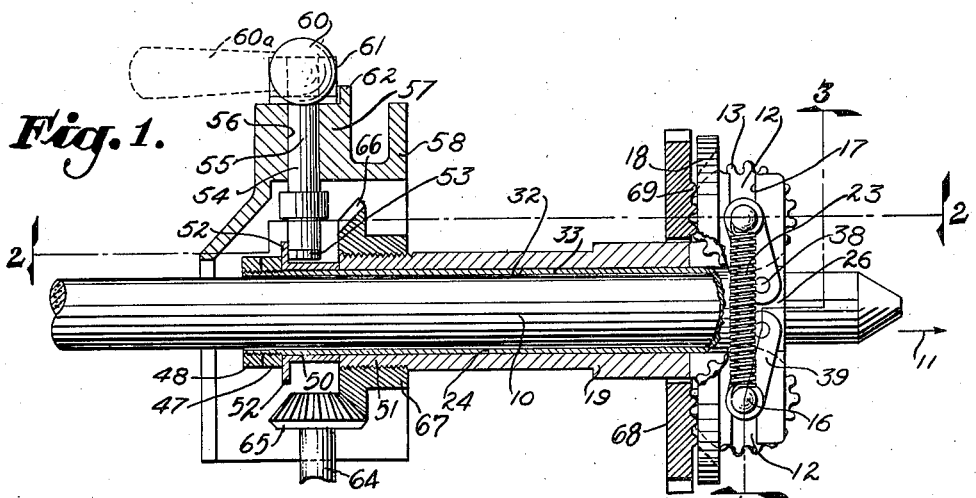
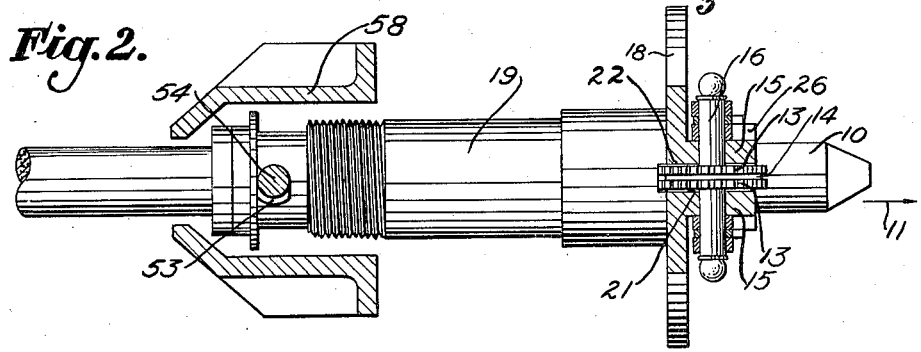
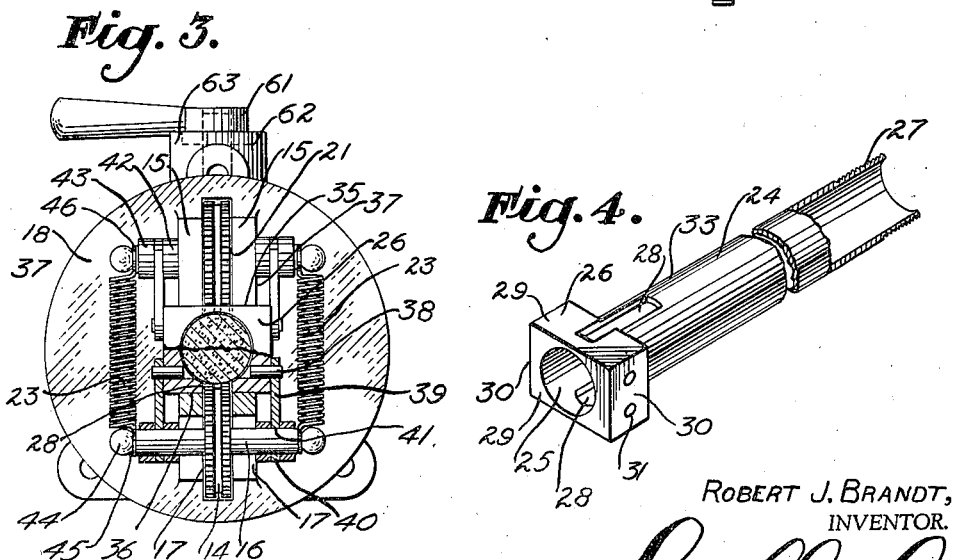
ROBERT J. BRANDT,
INVENTOR.
BY
ATTORNEY.

Patented June 28, 1938

2,122,195

REISSUED

FEB 13 1940

UNITED STATES PATENT OFFICE 2,122,195

ELECTRODE RELEASE FOR ARC LAMPS

Robert J. Brandt, Los Angeles, Calif.

Application November 9, 1937, Serial No. 173,674

7 Claims. (Cl. 176—119)

My invention relates to a simple means for releasing an electrode held in the propelling mechanism of an arc lamp, and relates in particular to a device which may be readily applied to existing arc lamps whereby the toothed wheels which drive the electrode may be quickly removed from engagement with the carbon so that the carbon may be readily taken from the lamp and replaced by a new one.

In arc lamps of the type to which the subject-matter of this invention is adapted for use, either one or both electrodes are continuously advanced and rotated during the operation of the lamp. An example of this type of arc lamp is disclosed in United States Patent No. 2,060,347, granted November 10, 1936, to Elmer C. Richardson.

The principal objection to lamps of this type has been the extreme difficulty in removing spent electrodes and replacing them with new ones. This difficulty has been due to the fact that no means was available to relieve the high pressure exerted on the electrode by the electrode advancing wheels or gears.

It is an object of the present invention to provide a simple and expedient means for releasing the electrode to permit ready replacement.

A further object of the present invention is to provide a control for actuating the electrode releasing mechanism which is sufficiently remote from the high temperature of the spark gap to eliminate danger to the operator.

Further objects and advantages of the invention will be brought out in the following part of the specification.

Referring to the drawing which is for illustrative purposes only:

Fig. 1 is a sectional view, partly sectioned on a vertical axially extending plane, and showing the invention applied to an existing type of carbon driving mechanism.

Fig. 2 is an elevational view, partly sectioned, indicated by the line 2—2 of Fig. 1.

Fig. 3 is a sectional view taken as indicated by the line 3—3 of Fig. 1.

Fig. 4 is a perspective view, partly sectioned, showing the operating tube which forms a part of the disclosed embodiment of the invention.

As shown in the drawing, a carbon 10 is moved, during the operation of the arc lamp, in the forward direction indicated by arrow 11. The carbon 10 may be at the same time rotated, but this rotation need be given no further consideration here for the reason that the present invention concerns means for releasing drive wheels 12 from engagement with the surface of the carbon, in order that the carbon may be moved in axial direction. It will be understood, of course, that release of the drive wheels 12 will also permit rotation of the carbon 10 on its longitudinal axis.

Where the invention is applied to existing carbon drives of arc lamps, the wheels 12 form part of the existing mechanism. These wheels 12 each have two rows of teeth 13 separated by a central annular groove 14, and in ordinary practice these drive wheels 12 are supported between outstanding walls 15 by shafts or pins 16 which project laterally through vertical slots 17 formed in the walls 15. The walls 15 project from an annular wall or plate 18 formed at the end of a sleeve 19 forming part of the existing type of carbon drive mechanism. The wheels 12 rest in vertical channels 21 which are formed between the side walls or plates 15, these channels extending through the wall 18, as indicated at 22. The channels 21, in which the wheels 12 operate, likewise communicate with the bore through which the carbon 10 passes so that the inner corners of the teeth 13 may engage the surface of the carbon to tightly grip and drive the same. The rotation and advancement of the electrode are accomplished in the following manner. The shaft 64 is rotated by any suitable source of power. The gear 65 is keyed to the shaft 64 and rotates with it. Gear 65 meshes with gear teeth 66 of the collar 67 which is securely fastened to the tube 19 by means of the thread 27. A disc-like gear member 68 is mounted on the tube 19 but is adapted to rotate independently thereof. This disc-like gear 68 is provided on one face with spiral or scroll gear teeth 69 which mesh with the gear teeth 13 on the wheels 12. It will thus be seen that rotation of the shaft 64 will cause rotation of the tube 19, which in turn will cause rotation of the integral annular wall or plate 18 which carries the gears 12. When the disc-like gear 68 is held stationary and the assembly which is mounted on the annular wall 18 is rotated about the axis of the electrode 10, the spiral gear teeth on the member 68 will cause the wheels 12 to rotate about their own axis to thus advance the electrode. Due to the engagement of the electrode 10 by the wheels 12, the electrode is rotated about its own axis. It will be readily understood that the member 68 may be held stationary or rotated in either direction to thereby vary the rate of advance of the electrode 10. The wheels 12 are forced with considerable pressure toward the carbon 10 by means of springs of the type indicated at 23, these springs extending from the ends of one shaft or pin 16 to the ends of the other shaft or pin 16.

In accordance with my present invention an operating tube 24, Fig. 4, is made with a bore 25 slightly larger in diameter than the carbon 10. On the forward end of the tube 24 a rectangular head 26 is formed, and the rearward end of the tube 24 is provided with threads 27. In the forward portion of the tube, so as to extend into the head 26, a pair of diametrally positioned openings or slots 28 are formed through which the inner portions of the wheels 12 may pass when the operating tube 24 is installed, as shown in Figs. 1, 2, and 3.

The head 26 of the operating tube 24 is of greater width than height and has upper and lower faces 29 and side faces 30. In each of the side faces 30 spaced holes 31 are drilled to receive in drive fit relation pivot pins which will be hereinafter set forth. The sleeve 19, as best shown in Fig. 1, is bored out so that the internal opening 32 thereof will slidably receive the body 33 of the operating tube 24. A milling cutter having a width substantially equal to the height of the head 26 is then passed laterally across the front face of the circular wall 18 so as to mill lower faces 35, Fig. 3, on the upper walls 15 and upper faces 36 on the lower walls 15, thereby forming a space between the upper walls 15 and the lower walls 15 in which the head 26 of the operating tube 24 may be received, as shown in Figs. 1 and 3, the edges of the head 26 projecting laterally beyond the lateral vertical faces 37 of the walls 15.

On pins 38, which are supported in the openings 31 of the head 26, the inner ends of toggle links 39 are swung, the outer ends 40 of these toggle links having openings 41 therein through which the shafts 16 pass. The outer ends of the links 39 are spaced from the walls 15 by spacing washers 42, and spacing washers 43 are placed against faces of the links 39, as shown in Figs. 2 and 3. The shafts 16 are shown with rounded heads 44 on the ends thereof, adjacent which heads circular grooves 45 exist in the end portions of the shafts 16 for engagement with loops 46 formed on the ends of the springs 23.

The collar 50 is concentric with sleeve 24 and is held in abutment with the end 51 of tube 19 by means of the lock nuts 47 and 48. This collar 50 has a radial flange 52 adapted to be engaged by a cam 53 formed on the lower end of an operating shaft 54 disposed in vertically extending relation. The upper portion 55 of the member 54 is passed through and supported in a vertical opening 56 formed in a boss 57 on the upper part of a casing 58 which is shaped so that it will fit over the end portion of the sleeve 19, as shown in Figs. 1 and 2. A handle 60 is secured to the upper end of the member 54 in such position that it may swing through an arc of substantially 90° from the full line position in which it is shown in Fig. 1 to the dotted line position 60a. The handle has a cylindrical hub 61 at the inner end thereof which fits on the upper end of the shaft 54. Around a portion of this hub 61 a wall 62 projects upwardly from the boss 57, the end portions 63 of this wall 62 forming stops to limit the swing of the handle 60.

It will be noted that two cooperating pairs of toggle links 39 are provided so that both end portions of each shaft 16 will be engaged by the toggle links. During the normal operation of the carbon drive or feeding device disclosed, the head 26 of the operating tube 24 will be disposed substantially in the position in which it is shown in Fig. 1. During the time the operating tube 24 and its head 26 are in this position, the toggle links 39 will be in the oblique position shown in Fig. 1, permitting the springs 23 to draw the feed rollers or wheels 12 forcibly into engagement with the surface of the carbon 10. Should it be desired to remove the carbon 10, for the purpose of replacement or renewal, for example, the operator merely swings the handle 60 from the full line position in which it is shown in Fig. 1 to the dotted line position 60a. This rotates the cam 53, Fig. 2, in clockwise direction through an arc of substantially 90°, with the result that the cam 53 will force the flange or shoulder 52 leftwardly, thereby shifting the operating tube 24 in leftward direction, with the result that the pins 38 of the head 26 will be carried leftwardly from the positions in which they are shown in Fig. 1. The straightening of the toggle links, or in other words the movement thereof toward vertical position, as the result of this movement of the pins 38, forces the shafts 16 and the drive wheels 12 supported thereon in outward direction, carrying these drive wheels 12 outwardly and likewise out of engagement with the surface of the carbon 10; whereupon, the carbon 10 may be freely moved in any direction as desired.

As used in this specification, the terms "electrode" and "carbon" are synonymous and this invention is not limited to use on any particular type of electrode.

I claim as my invention:

1. In an electrode holder for arc lamps, a plurality of gear members for engaging an electrode, means for rotating said gear members about the axis of the electrode and about their own axis, and a toggle for releasing said gear members from gripping contact with the electrode.

2. In an electrode holder for arc lamps, a plurality of rotatable gear members for engaging an electrode, said gear members being mounted on a toggle, and means for actuating said toggle to release the electrode, said means comprising a tube connected to said toggle and a cam for actuating said tube.

3. In an electrode holder, a plurality of rotatable gear members, springs for yieldably forcing said gear members into engagement with the electrode, and a toggle for forcing said gear members out of engagement with the electrode.

4. In an electrode holder for arc lamps, the combination of a plurality of rotatable gear members for engaging an electrode, a toggle connecting said gear members with a tube through which the electrode is passed, and a cam for moving said tube to thereby disengage said gear members from the electrode by means of said toggle.

5. In a device for rotating and advancing electrodes of arc lamps, means for releasing the electrodes from said device, said means comprising a toggle, a tube connected to said toggle, and a cam for moving said tube to thereby actuate said toggle.

6. In an electrode holder for arc lamps with a supporting member having an opening therethrough for passage of an electrode, a plurality of rotatable gear wheels carried by said supporting member, and elastic members for forcing said gear wheels into engagement with the electrode, the combination of a toggle, a tube surrounding the electrode and connecting said toggle to a cam, a handle for operating said cam to thereby actuate said toggle in such a manner as to force said gear wheels out of engagement with the electrode.

7. In an electrode holder for arc lamps, a plurality of gear members for engaging an electrode, a tube surrounding the electrode and a sleeve surrounding said tube, a cam for longitudinally moving said tube and links connecting said tube to said gear members to disengage said gear members from the electrode by the movement of said tube.

ROBERT J. BRANDT.